United States Patent [19]
Miller et al.

[11] Patent Number: 5,862,581
[45] Date of Patent: Jan. 26, 1999

[54] METHOD FOR MAKING A JOINT FOR A CORRUGATED PIPE SEGMENT

[75] Inventors: Lyle Eugene Miller, Dayton; James William Shade, Middletown, both of Ohio

[73] Assignee: Contech Construction Products, Inc., Middletown, Ohio

[21] Appl. No.: 772,940

[22] Filed: Dec. 24, 1996

Related U.S. Application Data

[62] Division of Ser. No. 520,310, Aug. 28, 1995, Pat. No. 5,707,088.

[51] Int. Cl.⁶ ..................................................... B23P 11/02
[52] U.S. Cl. ................................ 29/451; 29/458; 29/237; 29/557
[58] Field of Search ............................... 29/451, 237, 557, 29/458; 285/369, 903, 113, 345, 347, 910, 383, 226; 277/207 A, 208

[56] References Cited

U.S. PATENT DOCUMENTS

| | | |
|---|---|---|
| 1,324,602 | 12/1919 | Lorenz . |
| 2,304,793 | 12/1942 | Bodine, Jr. ................................. 29/557 |
| 2,896,976 | 7/1959 | Wiltse . |
| 3,602,263 | 8/1971 | Bremner . |
| 3,677,676 | 7/1972 | Hegler . |
| 3,794,364 | 2/1974 | Williams . |
| 3,897,090 | 7/1975 | Maroschak . |
| 3,899,198 | 8/1975 | Maroschak . |
| 3,926,222 | 12/1975 | Shroy et al. . |
| 3,929,359 | 12/1975 | Schmunk et al. . |
| 3,958,425 | 5/1976 | Maroschak . |
| 4,082,327 | 4/1978 | Sting et al. . |
| 4,132,047 | 1/1979 | Gerigk et al. ............................. 29/451 |
| 4,190,942 | 3/1980 | Tucker ....................................... 29/451 |
| 4,202,568 | 5/1980 | Stromöm . |
| 4,304,415 | 12/1981 | Wolf et al. . |
| 4,625,601 | 12/1986 | Brummet . |
| 4,647,072 | 3/1987 | Westman .................................. 29/451 |
| 4,702,502 | 10/1987 | Shade et al. . |
| 4,754,781 | 7/1988 | de Putter . |
| 4,779,651 | 10/1988 | Hegler et al. . |
| 4,878,285 | 11/1989 | Carstensen ................................ 29/451 |
| 4,900,503 | 2/1990 | Hegler et al. . |
| 4,915,425 | 4/1990 | Hegler et al. . |
| 4,946,206 | 8/1990 | Roe et al. . |
| 4,969,670 | 11/1990 | Bonnema et al. . |
| 5,071,173 | 12/1991 | Hegler et al. . |
| 5,326,138 | 7/1994 | Claes et al. . |
| 5,362,114 | 11/1994 | Levingston . |
| 5,415,440 | 5/1995 | Kanao . |
| 5,644,832 | 7/1997 | Kanao . |

FOREIGN PATENT DOCUMENTS

| | | |
|---|---|---|
| 964310 | 5/1972 | Canada . |
| 0275055 | 1/1987 | European Pat. Off. . |
| 2633678 | 7/1976 | Germany . |
| 3605330 | 2/1986 | Germany . |

*Primary Examiner*—Frances Han
*Attorney, Agent, or Firm*—Thompson Hine & Flory LLP

[57] ABSTRACT

A joint for coupling corrugated or ribbed pipe segments, including helical ribbed pipe segments, end-to-end includes a segment of corrugated or ribbed pipe having a plurality of corrugations or ribs spaced axially along the segment's outer surface, a spigot portion at an end of the segment where the corrugations or ribs have been partially removed to form annular bosses, an annular gasket positioned in the spigot portion, and a cylindrical coupling positioned over the spigot portion and gasket. The outer diameter of the coupling is substantially equal to the outer diameter of the corrugations or ribs, and the inner diameter of the coupling is larger than the outer diameter of the bosses such that a gap is formed between the coupling and the spigot portion. The gasket is sized to have a radial thickness slightly larger than the gap such that the gasket forms an air-tight seal between the spigot portion and the coupling when the spigot portion and gasket are inserted into the coupling. The gasket includes annular ribs extending from its outer circumference which are tapered at their leading edge to facilitate insertion of the spigot portion into the coupling, and are barb-shaped to resist separation of the spigot portion from the coupling once the joint is assembled.

17 Claims, 7 Drawing Sheets

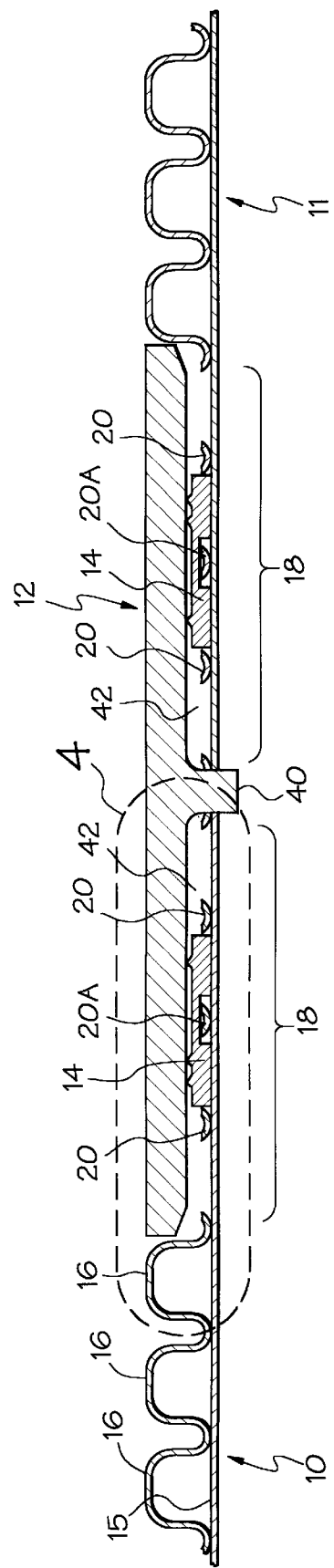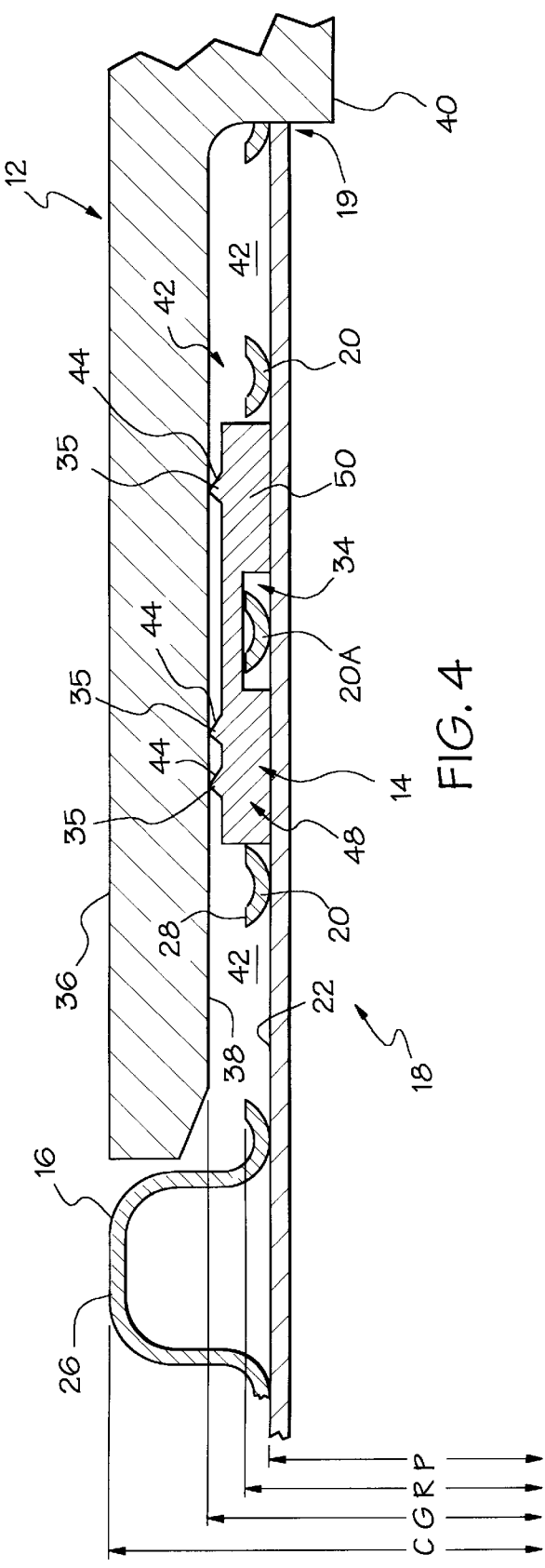

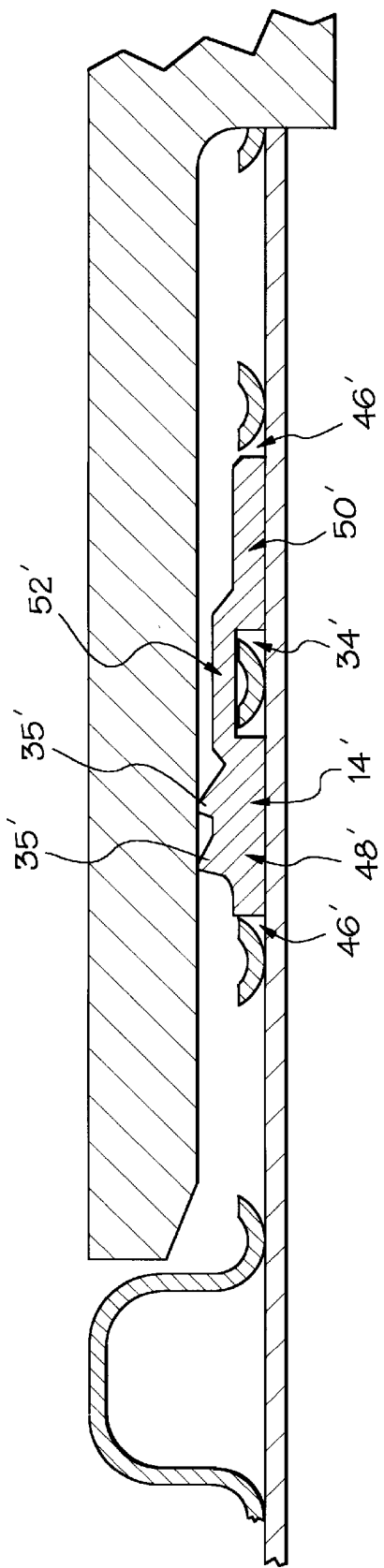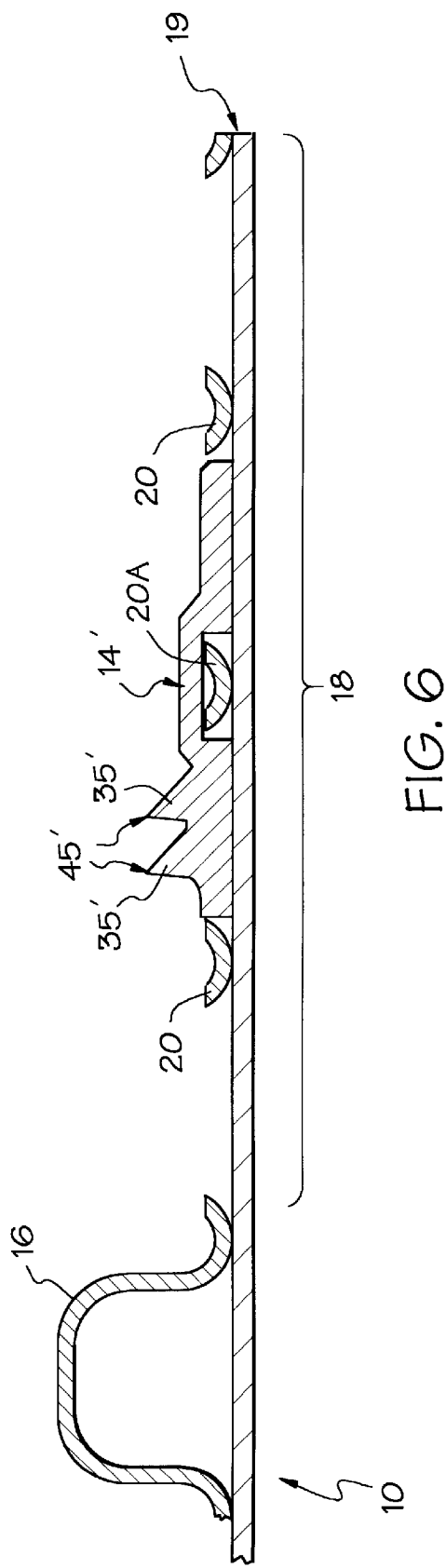

METHOD FOR MAKING A JOINT FOR A CORRUGATED PIPE SEGMENT

This is a divisional of application Ser. No. 08/520,310, filed Aug. 28, 1995 now U.S. Pat. No. 5,207,088.

BACKGROUND

The present invention relates to pipe joints and couplings and, more particularly, to a joint for coupling corrugated plastic pipe segments.

Plastic pipe is often used to reline worn concrete or tile pipes, such as sewer pipes. It is desirable for such liner pipes to have annular protrusions such as annular corrugations or ribs extending radially from their outer surfaces and axially spaced along their lengths to strengthen the wall of the pipe. Such protrusions may also take the form of a helical corrugation or helical rib spiralling axially along the outer surface of the pipe.

It also is desirable for such liner pipes to have a uniform outer diameter so that the liner pipe can be inserted through or pulled through sewer pipes without edges or projections snagging on or hanging up on protrusions on the interior surface of the pipe or casing to be relined. Therefore, it is preferable to provide a joint for coupling two ends of plastic liner pipe segments which has the same outer diameter as that of the liner pipe segments to be joined.

U.S. Pat. No. 5,071,173 to Hegler, et al. discloses a corrugated pipe joint having a coupling socket with an outer diameter substantially equal to the outer diameter of the corrugated pipe segments to be joined. To facilitate assembly of the joint, the joint of the Hegler, et al. patent provides a pipe having two sets of annular corrugations with different outer diameters. The conventional corrugations of the first set form the uniform outer diameter of the pipe segment. The second set of corrugations, which are spigot corrugations, have outer diameters smaller than the uniform outer diameter of the pipe segment and substantially equal to an inner diameter of the coupling socket. This is so that the coupling socket fits tightly over the spigot corrugations.

The smaller spigot corrugations are formed on the same equipment that the entire corrugated pipe segment is fabricated. Therefore, the finished pipe segment of the Hegler et al. patent cannot be selectively cut again to form shorter pipe segments. Furthermore, the Hegler et al. joint requires close tolerances between the joint components to create a tight fit, so that the outer diameters of the spigot corrugations must be substantially the same as the inner diameter of the coupling socket.

SUMMARY OF THE INVENTION

The present invention is a joint for coupling two segments of corrugated or ribbed plastic pipe end-to-end which is shaped to provide an outer diameter that is substantially the same as that of the pipe segments joined, and in which the spigot portion of the joint does not have to be formed at the time the pipe is formed, allowing selective cutting of pipe segments to meet different length requirements.

In accordance with the present invention, the joint for coupling corrugated or ribbed pipe segments comprises a segment of corrugated or ribbed pipe, a spigot portion extending from the end of the segment, a cylindrical coupling, and an annular gasket. The pipe segment has a smooth inner surface and an outer surface with a plurality of annular corrugations or ribs spaced axially along the segment. The spigot portion has an inner surface common with that of the segment, and its outer surface includes spaced annular bosses formed by annular corrugations or ribs whose radially outer portions have been machined off.

The annular bosses have outer surfaces with outer diameters less than the outer diameters of the corrugations or ribs of the pipe segments, and less than the inner diameter of the cylindrical coupling. The cylindrical coupling has an outer surface with a diameter substantially equal to those of the pipe segment corrugations or ribs. The annular gasket, which is formed from elastomeric material, is positioned to fit securely in the gasket seat created by bosses in the spigot portion.

To assemble the joint, the annular gasket is placed on the spigot, and the cylindrical coupling is slid over the spigot portion. Thus, the annular gap between the bosses of the spigot portion and the coupling is filled by the annular gasket. The gasket has a radial thickness slightly greater than the annular gap so that the gasket forms an air-tight seal between the spigot portion and the coupling, and the joint resists separation of the spigot portion from the coupling. The gasket is shaped to fit axially between and abut two of the annular bosses of the spigot portion, and includes an annular recess shaped to receive a third, intermediate boss, thus securing the gasket on the socket and preventing the gasket from sliding axially or displacing with respect to the spigot portion during the assembly of the joint.

The method for constructing a joint for a corrugated or ribbed plastic pipe segment according to the present invention comprises the following steps. First, annular corrugations or ribs on a spigot portion of a pipe segment are partially removed to form annular bosses. An annular, elastomeric gasket is placed over the spigot portion. A cylindrical coupling having an outer diameter substantially equal to that of the pipe segment and an inner surface with a diameter greater than the spigot portion is placed over the spigot portion and a lubricated gasket such that the gasket is compressed in the gap between the cylindrical coupling and the spigot portion and forms an air-tight seal between the spigot portion and the cylindrical coupling, and substantially prevents separation of the spigot portion from the cylindrical coupling.

In an alternate embodiment of the invention, the joint is made with solid, ribbed pipe. With such pipe, the solid ribs are machined off to form the socket, leaving annular bosses shaped to provide the gap with the coupling necessary for the socket to fit loosely into the coupling and receive the gasket in a liquid tight seal. In a second alternate embodiment, the joint is made with helically ribbed pipe having solid ribs. With this embodiment, the helical ribs are machined to form a socket portion, and are removed completely to form an annular area shaped to receive the annular gasket.

Accordingly, it is an object of the present invention to provide a joint assembly for coupling two segments of corrugated or ribbed plastic pipe which has substantially the same outer diameter as the corrugated or ribbed pipe segments; a joint assembly which can be easily constructed on a pipe segment; and a joint assembly which does not require close tolerances, yet creates a liquid-tight seal between the pipe segments and the coupling.

Other objects and advantages of the present invention will be apparent from the following description, the accompanying drawings and the appended claims.

BRIEF DESCRIPTION OF THE DRAWINGS

FIG. 3 is an enlarged detail of the dashed area 3 of FIG. 1.

FIG. 4 is an enlarged detail of the dashed area 4 of FIG. 3;

FIG. 5 is a detail of an alternate embodiment of the invention, showing the gasket construction;

FIG. 6 is the detail of FIG. 5, taken before the spigot portion with the gasket attached has been inserted into the coupling;

DETAILED DESCRIPTION OF THE DRAWINGS

Figure 1:
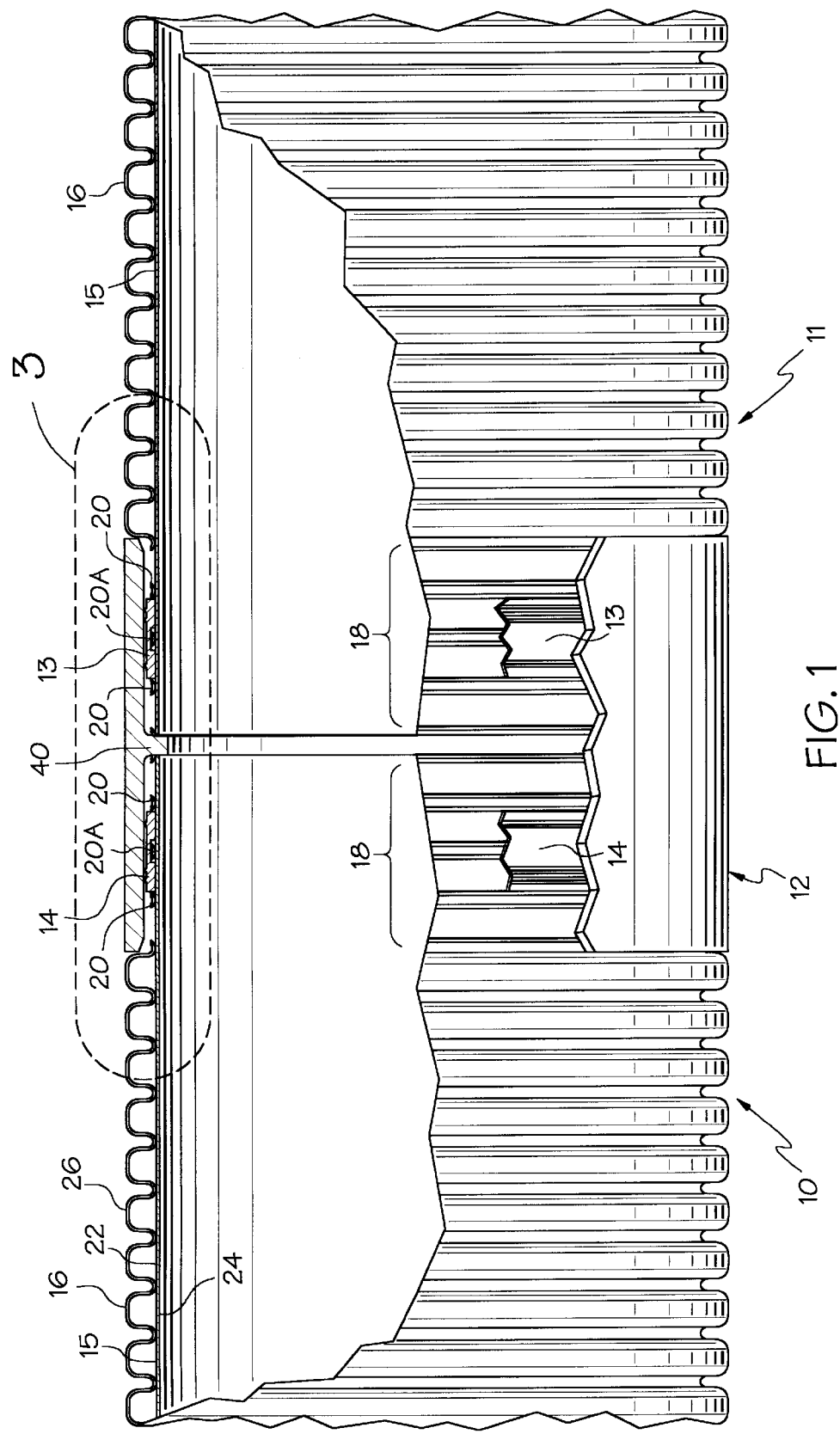
FIG. 1 is a side elevation, partially cut away and in section, of a preferred embodiment of the pipe joint of the present invention.
Figure 2:
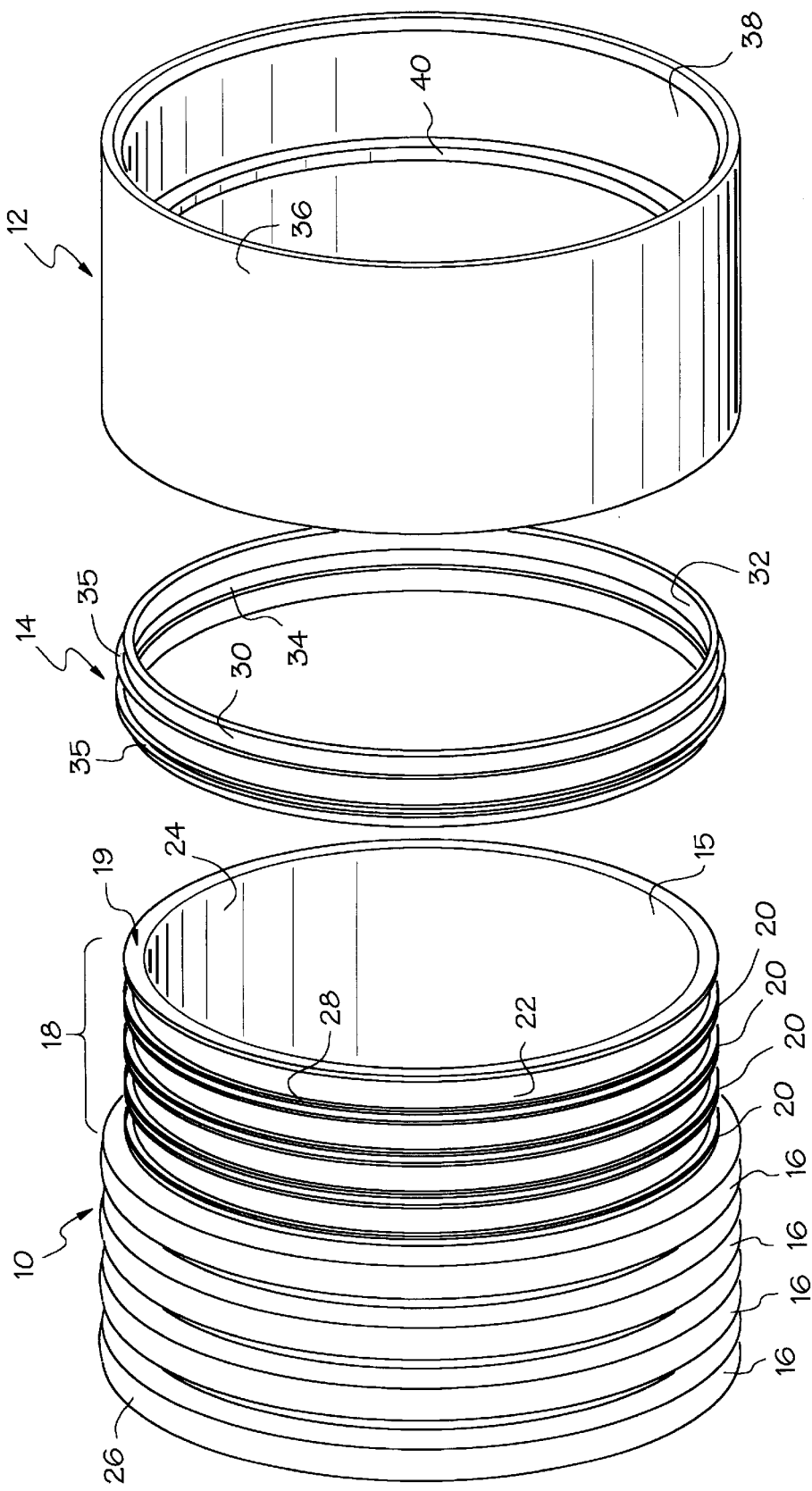
FIG. 2 is a perspective, exploded view of a portion of the pipe joint of FIG. 1.

As shown in FIGS. 1 and 2, the complete joint assembly of the present invention includes corrugated pipe segments 10,11, a cylindrical coupling 12 and annular gaskets 13,14. The pipe segments 10,11 are substantially identical in construction, each having a cylindrical wall 15 and an outer wall 16 shaped to form a plurality of annular corrugations extending about the outer periphery of the wall and spaced axially along the segments. The pipe segments 10,11 each include a spigot portion 18, formed at an end 19 thereof, in which the radially outer portions of the corrugations have been ground or machined off to form spaced annular bosses 20 projecting from the wall 15. Preferably, the corrugations of the spigot portion are reduced by a horizontal lathe, although any sufficient means to reduce the corrugations to the annular bosses will suffice. The wall 15 has an outer surface 22 and an inner surface 24, the corrugations 16 have outer surfaces 26 and the annular bosses have outer surfaces 28.

As shown in FIG. 2, the annular gasket 14 (as well as gasket 13) preferably is made of an elastomer, such as neoprene, and has an outer surface 30, inner surface 32 and an annular inner groove 34. The outer surface of the gasket 14 includes barb-shaped annular ribs 35 which point away from the end of the spigot 18 (when seated in the spigot portion) and act to seal and prevent separation of the joint assembly after it is assembled. The groove 34 is shaped to fit over and receive an intermediate annular boss 20A therein.

The coupling 12 has an outer surface 36, an inner surface 38 and an inner annular stop 40 positioned midway between the ends of the coupling. The pipe segments 10,11 and the coupling 12 are preferably made from PVC plastic or other thermoplastics including high-density polyethylene ("HDPE").

As shown in FIG. 1, two pipe segments 10,11 are joined end to end. Annular gaskets 13,14 are positioned on the spigot portions 18 over bosses 20. The gaskets 13,14 are shaped to fit between and abut two adjacent bosses 20, and fit over an intermediate boss 20A. After the gaskets 13,14 are lubricated, the spigot portions 18 are inserted into opposite ends of the coupling 12 until the socket ends abut the stop 40. Thus the coupling 12, in combination with the gaskets 13,14, joins the pipe segments 10 to each other to provide a fluid-tight fit.

As shown in FIGS. 3 and 4, the outer surfaces 22 of each pipe segment 10 has a diameter P, the outer surfaces 26 of annular corrugations 16 have diameters C, and the outer surfaces 28 of the bosses 20 have diameters R. Further, the inner surface 38 of coupling 12 has a diameter G which is greater than diameter R, and the outer surface 36 of the coupling has a diameter substantially equal to diameter C of the corrugations 16. Consequently, when the coupling 12 is positioned over the spigot portion 18, an annular gap 42 is formed between the coupling and the spigot portion. When the spigot portion 18, which carries the gasket 14, is inserted into the coupling 12, the ribs 35 give the gasket 14 an outside diameter slightly larger than G (the inner diameter of the coupling 12), so that the ribs 35 deform to close and seal the gap 42 and thus provide an air-tight seal in the gap 42. The ribs 35 have tapered leading edges 44 to facilitate insertion of the spigot portion 18 into the coupling 12 and are barb-shaped to resist separation of the spigot portion 18 from the coupling 12, once joined. The gasket 14 has three ribs 35: two ribs in a rear portion 48 of the gasket, and one lower rib in a forward portion 50 of the gasket which acts to help center and guide the coupling 12 over the spigot portion 18 during assembly.

As shown in FIGS. 5 and 6, an alternate embodiment of the gasket 14' has two ribs 35' as opposed to three as for gasket 14 (FIG. 3). Both ribs 35' are in the rear portion 48' of the gasket 14'. Furthermore, the gasket 14' has a raised groove portion 52' and depressed rear and forward portions 48' and 50'.

Figure 7:
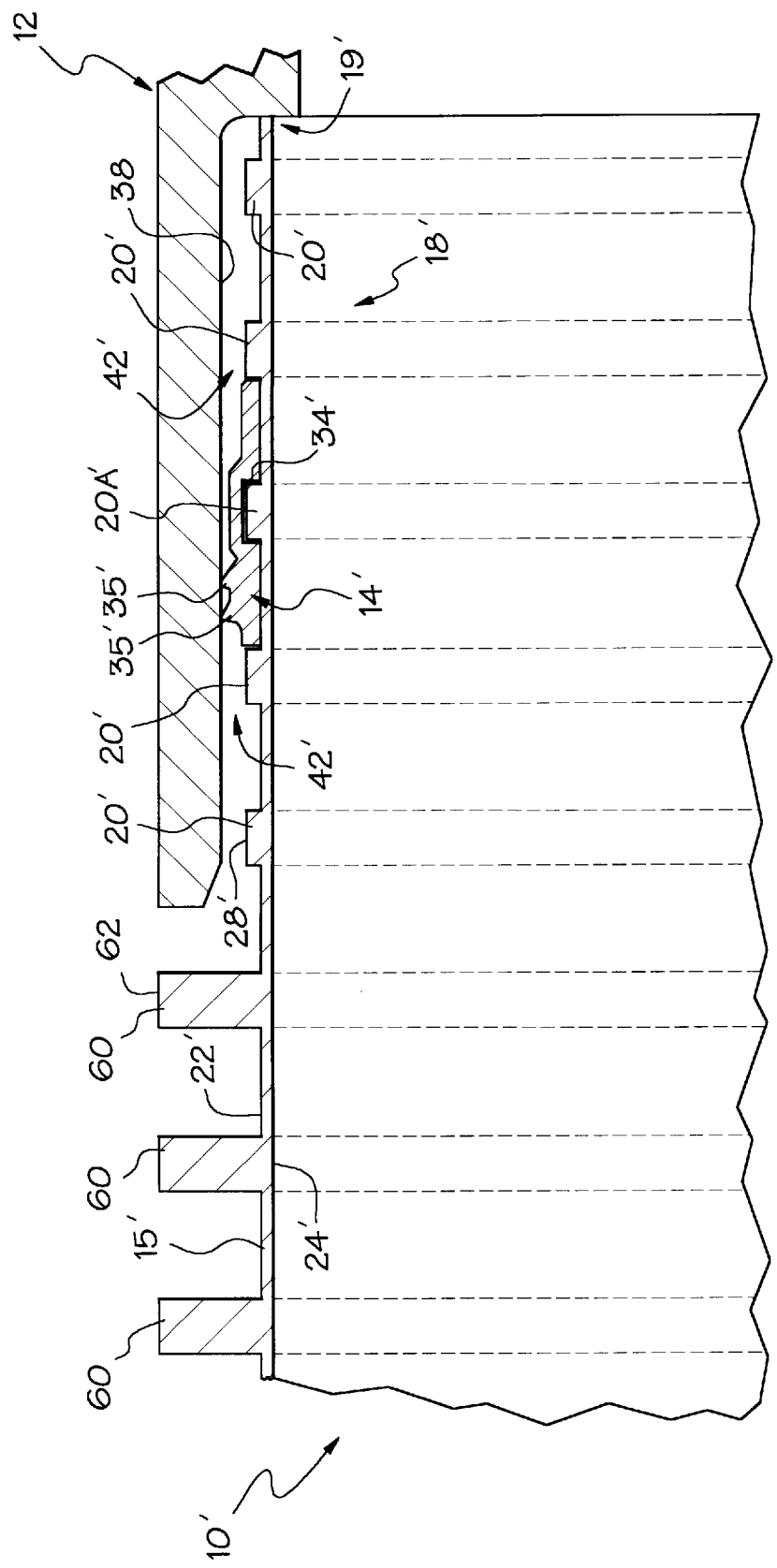
FIG. 7 is a detail of a second alternate embodiment of the invention for use with ribbed pipe segments.

As shown in FIG. 7, a second alternate embodiment of the joint assembly of the present invention includes a ribbed pipe segment 10', the cylindrical coupling 12 and the annular gasket 14' (the annular gasket 14' is shown in detail in FIGS. 5 and 6). The pipe segment 10' has a unitary cylindrical wall 15' having a plurality of annular ribs 60 extending from the outer periphery of the wall and spaced axially along the segment. The pipe segment 10' includes a spigot portion 18' formed at an end 19' thereof, in which the radially outer portions of the ribs 60 have been ground or machined off to form spaced annular bosses 20' projecting from the wall 15'. The wall 15' has an outer surface 22' and an inner surface 24'. The ribs 60 have outer surfaces 62 and the annular bosses 20' have outer surfaces 28'.

As with the embodiment of FIGS. 1–6, the outer surfaces 28' of the annular bosses have outer diameters less than the outer diameters of the ribs 60 and also less than the diameter of the inner surface 38 of the cylindrical coupling 12. The cylindrical coupling 12 has an outer diameter substantially equal to the outer diameters of the pipe segment ribs 60. The annular gasket 14', having an inner annular groove 34', is positioned to fit securely in a gasket seat created by three adjacent bosses in the spigot portion 18'.

The cylindrical coupling 12, when positioned over the spigot portion 18', forms an annular gap 42' between the bosses 20' of the spigot portion and the inner surface 38 of the coupling 12 which is bridged by the gasket 14'. The outer surface of the gasket 14' includes barb-shaped annular ribs 35' which give the gasket 14' a radial thickness slightly greater than the annular gap 42'. The ribs 35', which point away from the end of the spigot 18' (when the gasket is seated in the spigot portion) act to seal and prevent separation of the joint assembly after it is assembled.

Figure 8:
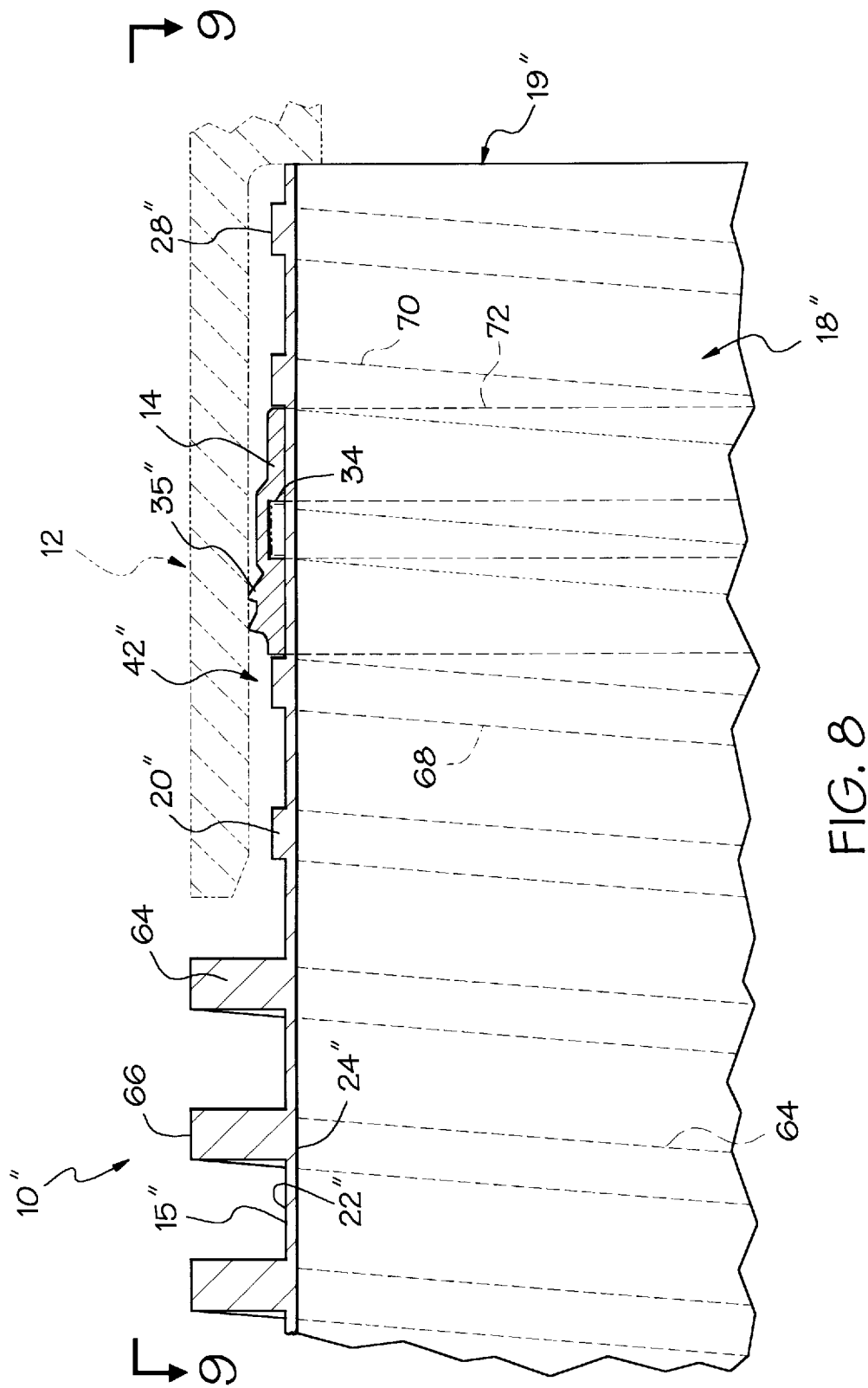
FIG. 8 is a detail of a third alternate embodiment of the invention for use with helical ribbed pipe segments, in which the coupling is in phantom.
Figure 9:
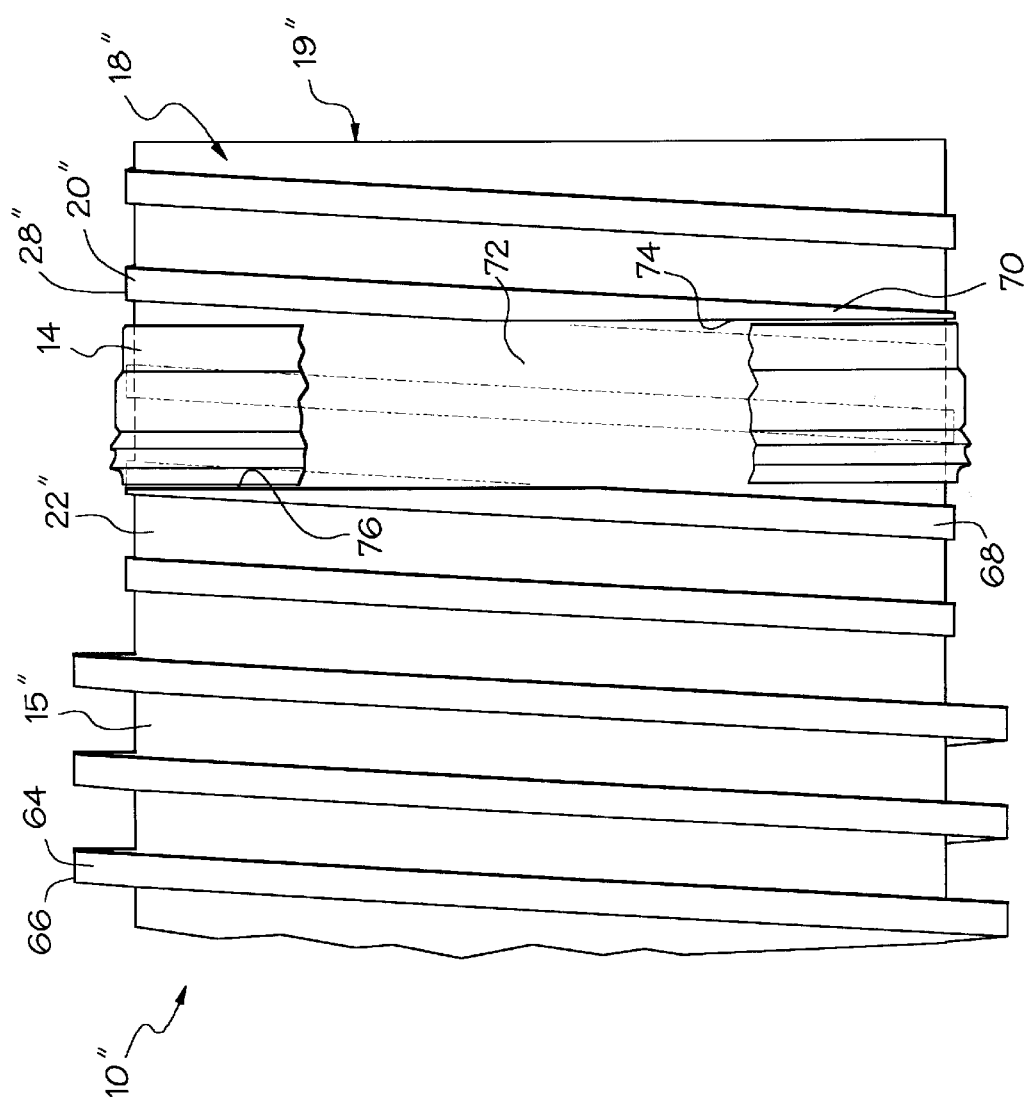
FIG. 9 is an elevational view of the embodiment of FIG. 8, in which the gasket is partially broken away.

As shown in FIGS. 8 and 9, a third alternate embodiment of the joint assembly of the present invention includes a pipe in which spaced annular protrusions are in the form of a helical rib of a helical ribbed pipe 10", a cylindrical coupling 12 (shown in phantom in FIG. 8) and a gasket 14. The pipe segment 10" has a unitary cylindrical wall 15" having a solid, continuous helical rib 64 unitary with and extending from the outer periphery of the wall and spiralling axially along the segment. The pipe segment 10" includes a spigot portion 18", formed at an end 19" thereof, in which the radially outer portion of the rib 64 has been ground or machined off to form a helical boss 20" projecting from the wall 15". The wall 15" has an outer surface 22" and an inner surface 24", the helical rib 64 has an outer surface 66 and the helical boss 20", has an outer surface 28". The outer surface 28" of the helical boss has an outer diameter less than the outer diameter of the helical rib 64 and also less than the inner diameter of the cylindrical coupling 12. As with the other embodiments of FIGS. 1–7, the cylindrical coupling 12 has an outer diameter substantially equal to the outer diameter of the helical rib 64.

The gasket 14 is a continuous, annular strip of elastomeric material having an inner groove 34 and a width sufficient to fit between two windings 68,70 of ribs 20" which have been machined to provide an annular flat area 72. The windings 68,70 have machined flats 74,76 which abut the leading and trailing ends of the gasket 14 and define boundaries of the flat area 72.

The cylindrical coupling 12 is positioned over the spigot portion 18", thus forming an annular gap 42" between the helical boss 20" of the spigot portion and the coupling 12 which is bridged by the gasket 14. The outer surface of the gasket 14" includes barb-shaped ribs 35 which give the gasket 14 a radial thickness slightly greater than the annular gap 42". The ribs 35, which point away from the end of the spigot 18" (when the gasket is seated in the spigot portion) act to seal and prevent separation of the joint assembly after it is assembled.

Fabrication of the joint assembly is as follows. A segment of corrugated or ribbed plastic piping is first cut to length. Corrugations or ribs at the end of the segment to be joined are machined to form the annular bosses of a spigot. The annular gasket is then stretched over a middle boss and between the two outer bosses of the three adjacent bosses and oriented such that the barbed ribs of the gasket point away from the open end of the spigot. For the embodiment of FIGS. 8 and 9, this process is modified such that an annular flat area is formed on the socket. With this embodiment, there is no central boss to fit in recess 34. The spigot with the gasket is then lubricated and inserted into an end of a cylindrical coupling until the end of the spigot reaches the internal annular stop in the coupling. The barbed ribs on the gasket prevent the spigot from being easily removed from the coupling and provides an air-tight seal between the spigot and the coupling. The process is then repeated for a second segment of corrugated pipe, which is inserted into the open, opposite end of the coupling, as shown in FIG. 1.

Having described the invention in detail and by reference to the drawings, it will be apparent that modification and variations are possible without departing from the scope of the invention as defined in the following claims.

What is claimed is:

1. A method for making a joint for a pipe segment having a plurality of spaced annular protrusions extending outwardly therefrom, comprising the steps of:

partially removing annular protrusions on an end portion of a pipe segment to form annular bosses, such that said end portion forms a spigot, said pipe segment having an outer surface with a first diameter, said annular protrusions having outer surfaces of a second diameter, and said annular bosses having outer surfaces of a third diameter;

positioning a substantially annular elastomeric gasket over a portion of said spigot, said gasket having an inner surface with a diameter substantially equal to said first diameter and said gasket having an outer surface with a fourth diameter greater than said third diameter;

selecting a cylindrical coupling having an outer surface with a diameter substantially equal to said second diameter and an inner surface with a diameter substantially equal to said fourth diameter; and positioning said coupling over said spigot and gasket, wherein said gasket fills a radial gap formed between said coupling inner surface and said spigot, such that said gasket forms an air-tight seal between said spigot and said coupling;

whereby, upon forming the joint according to the above steps, the joint and adjacent pipe segment have a substantially uniform outer diameter.

2. The method of claim 1 wherein said gasket is fitted between first and second selected annular bosses.

3. The method of claim 2 wherein said gasket includes an inner annular groove shaped to receive a third selected annular boss axially positioned between said first and said second annular bosses.

4. The method of claim 3 wherein said gasket includes axial ends abutting said first and second annular bosses such that said gasket is prevented from sliding axially on said spigot.

5. The method of claim 1 wherein said gasket has a substantially barb-shaped annular rib extending about an outer periphery thereof to resist withdrawal of said spigot from said coupling.

6. The method of claim 5 wherein said annular rib of said gasket has a tapered leading edge to facilitate insertion of said spigot within said coupling.

7. The method of claim 6 wherein said gasket has a plurality of said annular ribs.

8. The method of claim 1 wherein said step of partially removing said protrusions includes the step of cutting said protrusions.

9. The method of claim 8 wherein said cutting step comprises cutting said protrusions with a horizontal lathe.

10. The method of claim 1 wherein said coupling includes an annular stop extending radially inwardly from said coupling inner surface, and said coupling is positioned over said spigot such that said segment abuts said stop.

11. The method of claim 1 further comprising the step of lubricating said outer surface of said gasket.

12. The method of claim 1 further comprising the step of positioning said coupling over a second one of said spigots having a second one of said gaskets mounted thereon such that said spigots are substantially coaxial.

13. A method for making a joint to couple a pair of pipe segments end to end, the pipe segments having a plurality of spaced, substantially annular protrusions extending radially outwardly therefrom, comprising the steps of:

partially removing substantially annular protrusions on an end portion of a pair of pipe segments to form substantially annular bosses, such that each of said end portions form a spigot, said pipe segments having an outer surface of a first diameter, said substantially annular protrusions having an outer surface of a second diameter, and said substantially annular bosses having outer surfaces of a third diameter;

selecting a cylindrical coupling having an outer surface with a diameter substantially equal to said second diameter and an inner surface with a diameter sufficient to receive said spigots therein; and inserting one of said spigots in one end of said cylindrical coupling and inserting the other of said spigots in the other end of said cylindrical coupling;

whereby, upon forming the joint according to the above steps, the joint and adjacent pipe segment have a substantially uniform outer diameter.

14. The method of claim 3 further comprising the step of forming an air-tight seal between said spigots and said cylindrical coupling.

15. A method for making a joint for a corrugated pipe segment comprising the steps of:

providing a corrugated pipe segment having a plurality of spaced annular corrugations extending outwardly therefrom, the annular corrugations having an outer diameter;

radially reducing the annular corrugations on an end portion of the pipe segment so as to form a spigot on the end portion;

positioning a substantially annular gasket over a portion of the spigot, the gasket having an outer diameter;

selecting a cylindrical coupling having an outer surface with diameter substantially equal to the outer diameter of the corrugations and an inner surface with a diameter slightly less than the outer diameter of the gasket; and positioning the coupling over the spigot and gasket, wherein the gasket is compressed into a radial gap formed between the coupling inner surface and the spigot, such that the gasket forms a seal between the spigot and the coupling.

16. A method for making a joint for a ribbed pipe segment comprising the steps of:

providing a ribbed pipe segment having a plurality of spaced annular ribs extending outwardly therefrom, the annular ribs having an outer diameter;

radially reducing the annular ribs on an end portion of the pipe segment so as to form a spigot on the end portion;

positioning a substantially annular gasket over a portion of the spigot, the gasket having an outer diameter;

selecting a cylindrical coupling having an outer surface with diameter substantially equal to the outer diameter of the ribs and an inner surface with a diameter slightly less than the outer diameter of the gasket; and positioning the coupling over the spigot and gasket, wherein the gasket is compressed into a radial gap formed between the coupling inner surface and the spigot, such that the gasket forms a seal between the spigot and the coupling.

17. A method for making a joint for a ribbed pipe segment comprising the steps of:

providing a ribbed pipe segment having at least one helical rib extending outwardly therefrom and axially therealong, the helical rib having an outer diameter;

radially reducing the helical rib on an end portion of the pipe segment so as to form a spigot on the end portion;

positioning a substantially annular gasket over a portion of the spigot, the gasket having an outer diameter;

selecting a cylindrical coupling having an outer surface with diameter substantially equal to the outer diameter of the helical rib and an inner surface with a diameter slightly less than the outer diameter of the gasket; and positioning the coupling over the spigot and gasket, wherein the gasket is compressed into a radial gap formed between the coupling inner surface and the spigot, such that the gasket forms a seal between the spigot and the coupling.

* * * * *